US009828476B2

(12) United States Patent
Bensason et al.

(10) Patent No.: US 9,828,476 B2
(45) Date of Patent: Nov. 28, 2017

(54) LINEAR LOW DENSITY POLYETHYLENE COMPOSITION SUITABLE FOR CAST FILM (75) Inventors: Selmin Bensason, Rueschlikon (CH); Mehmet Demirors, Pearland, TX (US); Xiao Bing Yun, Beijing (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/411,565

(22) PCT Filed: Jul. 20, 2012

(86) PCT No.: PCT/CN2012/078951
§ 371 (c)(1),
(2), (4) Date: Apr. 27, 2015

(87) PCT Pub. No.: WO2014/012250
PCT Pub. Date: Jan. 23, 2014

(65) Prior Publication Data
US 2015/0225520 A1   Aug. 13, 2015

(51) Int. Cl.
| C08F 210/16 | (2006.01) |
| C08J 5/18 | (2006.01) |
| B32B 27/20 | (2006.01) |
| B32B 27/32 | (2006.01) |
| B29C 55/02 | (2006.01) |
| C08L 23/06 | (2006.01) |
| C08L 23/08 | (2006.01) |
| B29K 23/00 | (2006.01) |
| B29L 9/00 | (2006.01) |
| C08F 4/659 | (2006.01) |

(52) U.S. Cl.
CPC ............... *C08J 5/18* (2013.01); *B29C 55/02* (2013.01); *B32B 27/205* (2013.01); *B32B 27/32* (2013.01); *B29K 2023/0625* (2013.01); *B29L 2009/00* (2013.01); *B32B 2307/31* (2013.01); *B32B 2307/542* (2013.01); *B32B 2307/558* (2013.01); *B32B 2307/5825* (2013.01); *B32B 2439/70* (2013.01); *B32B 2555/00* (2013.01); *C08F 4/659* (2013.01); *C08F 4/65908* (2013.01); *C08F 4/65912* (2013.01); *C08J 2301/00* (2013.01); *C08J 2323/08* (2013.01); *C08L 23/06* (2013.01); *C08L 23/0815* (2013.01); *C08L 2203/16* (2013.01)

(58) Field of Classification Search
CPC   C08F 210/16; C08F 2500/03; C08F 2500/08; C08F 2500/12; C08F 2500/17; C08F 2500/19; C08L 23/16; C08L 2203/16; B32B 27/32
See application file for complete search history.

(56) References Cited

U.S. PATENT DOCUMENTS

| 4,728,325 A * | 3/1988 | Spiller ............... A61L 15/24 524/240 |
| 5,460,861 A * | 10/1995 | Vicik ................ B32B 27/32 156/244.22 |
| 8,372,931 B2 * | 2/2013 | Hermel-Davidock .. C08F 10/00 526/348 |
| 8,629,214 B2 * | 1/2014 | Karjala ............... C08F 10/00 525/191 |
| 8,829,115 B2 * | 9/2014 | Hermel-Davidock .. C08F 10/00 525/240 |
| 8,889,794 B2 * | 11/2014 | Wang ................... C08J 5/18 428/523 |
| 2011/0151216 A1* | 6/2011 | Pirtle ................ B32B 27/32 428/213 |
| 2015/0132514 A1* | 5/2015 | Wang ............ B29C 47/0026 428/35.7 |

(Continued)

FOREIGN PATENT DOCUMENTS

| JP | 5-84816 A | * 4/1993 | ............ B29C 55/02 |
| WO | 9733921 | † 9/1997 | |
| WO | 2011002868 | † 1/2011 | |

(Continued)

OTHER PUBLICATIONS

PCT/CN2012/078951 International Search Report and Written Opinion dated May 2, 2013, 10 pages.

(Continued)

*Primary Examiner* — Rip A Lee
(74) *Attorney, Agent, or Firm* — Dinsmore & Shohl LLP (57) ABSTRACT The instant invention provides a linear low density polyethylene composition suitable for cast film, films made therefrom, and packaging devices comprising one or more such film layers. The linear low density polyethylene composition suitable for cast film according to the present invention comprises an ethylene/α-olefin interpolymer composition having a Comonomer Distribution Constant (CDC) in the range of from 40 to 200, for example from 40 to 150, a vinyl unsaturation of less than 0.12 vinyls per one thousand carbon atoms present in the backbone of the ethylene-based polymer composition; a zero shear viscosity ratio (ZSVR) in the range from 1.2 to 5, for example from 1.5 to 4; a density in the range of from 0.910 to 0.935, for example from 0.915 to 0.925, g/cm$^3$, a melt index ($I_2$) in a range of from 1 to 10, for example from 2 to 6 g/10 minutes, a molecular weight distribution ($M_w/M_n$) in the range of from 2 to 3.5.

6 Claims, 2 Drawing Sheets

(56) References Cited

U.S. PATENT DOCUMENTS

2015/0299440 A1\* 10/2015 Wang .................. B29C 47/0026 428/35.2

FOREIGN PATENT DOCUMENTS

| WO | WO2011002868 | 1/2011 | | |
|---|---|---|---|---|
| WO | 2011109563 | 9/2011 | | |
| WO | 2011150193 | 12/2011 | | |
| WO | 2011159376 | 12/2011 | | |
| WO | 2012061168 | 5/2012 | | |
| WO | WO 2012/061168 A1 \* | 5/2012 | .............. | C08L 23/08 |
| WO | WO2012061168 | 5/2012 | | |

OTHER PUBLICATIONS

PCT/CN2012/078951 International Preliminary Report on Patentability dated Jan. 20, 2015, 5 pages.

Rules 161(2) and 162 EPC Communication dated Mar. 4, 2015 for counterpart EPO Application No. EP12881172.6, 3 pages.

Response to Rules 161(2) and 162 EPC Communication dated Mar. 25, 2015 for counterpart EPO Application No. EP12881172.6, 15 pages.

EP Extended Search Report Office Action dated Jan. 8, 2016; from EP counterpart Application No. 12881172.6.

Chinese Office Action dated Feb. 6, 2016; from Chinese counterpart Application No. 201280075866.8.

EP Office Action dated Jan. 26, 2016; from EP counterpart Application No. 12881172.6.

Chinese Office Action dated Oct. 8, 2016; from Chinese counterpart Application No. 201280075866.8.

Japanese Office Action dated May 31, 2016; from Japanese counterpart Application No. 2015-521935.

Chinese Response to Office Action dated Jun. 20, 2016; from Chinese counterpart Application No. 201280075866.8.

EP Office Action dated Sep. 6, 2016; from EP counterpart Application No. 12881172.6.

Butler and Morris, Chapter 15, "PE based multilayer film structures", in "Multilayer Flexible Packaging", pp. 205-230, 2009, Elsevier Inc.†

Vasile and Pascu, "Practical Guide to Polyethylene", pp. 109 and 114-121, 2005, Rapra Technology Limited.†

\* cited by examiner

† cited by third party

```
;lc1prf2_zz
prosol relations = <lenmr>
#include <Avance.incl>

"d12=20u"
"d11 = iu"

1 ze
d12 pl2l: f2
2 30m
d13
d12 pl9: f1
d1 cw:f1 ph29 cw:f2 ph29
d11 do: f1 do: f2
d12 pl1: f1
p1 ph1
30m mc #0 to 2 F0(zd)
exit ph1 = 0 2 2 0 1 3 3 1
ph29 = 0
ph31 = 0 2 2 0 1 3 3 1
```

LINEAR LOW DENSITY POLYETHYLENE COMPOSITION SUITABLE FOR CAST FILM

FIELD OF INVENTION

The instant invention relates to a linear low density polyethylene composition suitable for cast film, films made therefrom, and packaging devices comprising one or more such film layers.

BACKGROUND OF THE INVENTION

The use of polyethylene compositions, such as linear low density polyethylenes and/or high density polyethylenes, in fabrication of films is generally known. Any conventional method, such as gas phase process, slurry process, or solution process, may be employed to produce such polyethylene compositions. In addition, any conventional cast film extrusion process may be employed to produce such films.

Various polymerization techniques using different catalyst systems have been employed to produce such polyethylene compositions suitable for cast film production applications. However, the currently available polyethylene compositions fail to meet all the desired film properties.

Despite the research efforts in developing linear low density polyethylene compositions suitable for cast film production applications, there is still a need for a linear low density polyethylene composition having improved film properties.

SUMMARY OF THE INVENTION

The instant invention provides a linear low density polyethylene composition suitable for cast film, films made therefrom, and packaging devices comprising one or more such film layers.

In one embodiment, the instant invention provides a linear low density polyethylene composition suitable for cast film comprising an ethylene/α-olefin interpolymer composition (LLDPE) having a Comonomer Distribution Constant (CDC) in the range of from 40 to 150 (40 to 200), a vinyl unsaturation of less than 0.12 vinyls per one thousand carbon atoms present in the backbone of the ethylene-based polymer composition; a zero shear viscosity ratio (ZSVR) in the range from 1.5 to 4 (1.2 to 5); a density in the range of from 0.915 to 0.925 (0.910 to 0.935) g/cm$^3$, a melt index ($I_2$) in a range of from 2 to 6 (1-10) g/10 minutes, a molecular weight distribution ($M_w/M_n$) in the range of from 2 to 3.5.

In an alternative embodiment, the instant invention further provides cast film comprising a linear low density polyethylene composition comprising an ethylene/α-olefin interpolymer composition having a Comonomer Distribution Constant (CDC) in the range of from 40 to 150 (40 to 200), a vinyl unsaturation of less than 0.15 vinyls per one thousand carbon atoms present in the backbone of the ethylene-based polymer composition; a zero shear viscosity ratio (ZSVR) in the range from 1.5 to 4 (1.2 to 5); a density in the range of from 0.915 to 0.925 (0.910 to 0.935) g/cm$^3$, a melt index ($I_2$) in a range of from 2 to 6 (1-10)g/10 minutes, a molecular weight distribution ($M_w/M_n$) in the range of from 2 to 3.5.

In an alternative embodiment, the instant invention further provides a multilayer structure comprising at least one layer comprising the inventive linear low density polyethylene composition.

In an alternative embodiment, the instant invention provides a film, in accordance with any of the preceding embodiments, except that the film is stretched at least in one direction.

In an alternative embodiment, the instant invention provides a multilayer structure, in accordance with any of the preceding embodiments, except that the multilayer structure is stretched in at least one direction.

In an alternative embodiment, the instant invention further provides a packaging device comprising the film or the multilayer structure in accordance with any of the preceding embodiments.

In an alternative embodiment, the instant invention provides a packaging device, in accordance with any of the preceding embodiments, except that the packaging device is used as food packaging device, or non-food packaging device.

In an alternative embodiment, the instant invention provides a film or a multilayer structure, in accordance with any of the preceding embodiments, except that the film or multilayer structure is used as a hygiene product.

In an alternative embodiment, the instant invention provides a film, in accordance with any of the preceding embodiments, except that the film is formed into tapes for use in artificial turf or woven textiles.

DETAILED DESCRIPTION OF THE INVENTION

The instant invention provides a linear low density polyethylene composition suitable for cast film, films made therefrom, and packaging devices comprising one or more such film layers.

The linear low density polyethylene composition suitable for cast film according to the present invention comprises an ethylene/α-olefin interpolymer composition having a Comonomer Distribution Constant (CDC) in the range of from 40 to 200, for example from 40 to 150, a vinyl unsaturation of less than 0.12 vinyls per one thousand carbon atoms present in the backbone of the ethylene-based polymer composition; a zero shear viscosity ratio (ZSVR) in the range from 1.2 to 5, for example from 1.5 to 4; a density in the range of from 0.910 to 0.935, for example from 0.915 to 0.925, g/cm$^3$, a melt index ($I_2$) in a range of from 1 to 10, for example from 2 to 6, g/10 minutes, a molecular weight distribution ($M_w/M_n$) in the range of from 2 to 3.5.

The ethylene/α-olefin interpolymer composition (linear low density polyethylene (LLDPE)) comprises (a) less than or equal to 100 percent, for example, at least 70 percent, or at least 80 percent, or at least 90 percent, by weight of the units derived from ethylene; and (b) less than 30 percent, for example, less than 25 percent, or less than 20 percent, or less than 10 percent, by weight of units derived from one or more α-olefin comonomers. The term "ethylene/α-olefin interpolymer composition" refers to a polymer that contains more than 50 mole percent polymerized ethylene monomer (based on the total amount of polymerizable monomers) and, optionally, may contain at least one comonomer.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The ethylene/α-olefin interpolymer composition is characterized by having a Comonomer Distribution Constant in the range of from greater than from 40 to 200, for example from 40 to 150.

The ethylene-based polymer composition is characterized by having a zero shear viscosity ratio (ZSVR) in the range of from 1.2 to 5, for example, from 1.5 to 4.

The ethylene/α-olefin interpolymer composition has a density in the range of 0.910 to 0.935 g/cm$^3$, for example from 0.915 to 0.925 g/cm$^3$. For example, the density can be from a lower limit of 0.910, 0.915, or 0.918 g/cm$^3$ to an upper limit of 0.925, 0.930, 0.935 g/cm$^3$.

The ethylene/α-olefin interpolymer composition has a molecular weight distribution ($M_w/M_n$) in the range of from 2.0 to 3.5. For example, the molecular weight distribution ($M_w/M_n$) can be from a lower limit of 2, 2.1, or 2.2 to an upper limit of 2.5, 2.7, 2.9, 3.2, or 3.5.

The ethylene/α-olefin interpolymer composition has a melt index ($I_2$) in the range of from 1 to 10 g/10 minutes, for example from 2 to 6 g/10 minutes. For example, the melt index ($I_2$) can be from a lower limit of 1, 2, or 2.5 g/10 minutes to an upper limit of 6, 8, or 10 g/10 minutes.

The ethylene/α-olefin interpolymer composition has a vinyl unsaturation of less than 0.15, for example less than 0.12, vinyls per one thousand carbon atoms present in the backbone of the ethylene-based polymer composition.

The ethylene/α-olefin interpolymer composition has a long chain branching frequency in the range of from 0.02 to 3 long chain branches (LCB) per 1000 C.

In one embodiment, the ethylene/α-olefin interpolymer composition comprises less than or equal to 100 parts, for example, less than 10 parts, less than 8 parts, less than 5 parts, less than 4 parts, less than 1 parts, less than 0.5 parts, or less than 0.1 parts, by weight of metal complex residues remaining from a catalyst system comprising a metal complex of a polyvalent aryloxyether per one million parts of the ethylene-based polymer composition. The metal complex residues remaining from the catalyst system comprising a metal complex of a polyvalent aryloxyether in the ethylene-based polymer composition may be measured by x-ray fluorescence (XRF), which is calibrated to reference standards. The polymer resin granules can be compression molded at elevated temperature into plaques having a thickness of about ⅜ of an inch for the x-ray measurement in a preferred method. At very low concentrations of metal complex, such as below 0.1 ppm, ICP-AES would be a suitable method to determine metal complex residues present in the ethylene-based polymer composition.

The ethylene/α-olefin interpolymer composition may further comprise additional components such as one or more other polymers and/or one or more additives. Such additives include, but are not limited to, antistatic agents, color enhancers, dyes, lubricants, fillers such as $TiO_2$ or $CaCO_3$, opacifiers, nucleators, processing aids, pigments, primary antioxidants, secondary antioxidants, processing aids, UV stabilizers, anti-blocks, slip agents, tackifiers, fire retardants, anti-microbial agents, odor reducer agents, anti fungal agents, and combinations thereof. The ethylene-based polymer composition may contain from about 0.1 to about 10 percent by the combined weight of such additives, based on the weight of the ethylene-based polymer composition including such additives.

In one embodiment, the ethylene/α-olefin interpolymer composition may be blended with one or more low density polyethylene (LDPE) composition, for example less than 20 percent by weight of the LDPE composition, to form a physical blend.

In one embodiment, ethylene/α-olefin interpolymer composition has a comonomer distribution profile comprising a monomodal distribution or a bimodal distribution in the temperature range of from 35° C. to 120° C., excluding purge.

Any conventional ethylene (co)polymerization reaction processes may be employed to produce the ethylene-based polymer composition. Such conventional ethylene (co)polymerization reaction processes include, but are not limited to, gas phase polymerization process, slurry phase polymerization process, solution phase polymerization process, and combinations thereof using one or more conventional reactors, e.g. fluidized bed gas phase reactors, loop reactors, stirred tank reactors, batch reactors in parallel, series, and/or any combinations thereof.

In one embodiment, the ethylene/α-olefin interpolymer composition is prepared via a process comprising the steps of: (a) polymerizing ethylene and optionally one or more α-olefins in the presence of a first catalyst to form a semi-crystalline ethylene-based polymer in a first reactor or a first part of a multi-part reactor; and (b) reacting freshly supplied ethylene and optionally one or more α-olefins in the presence of a second catalyst comprising an organometallic catalyst thereby forming an ethylene/α-olefin interpolymer composition in at least one other reactor or a later part of a multi-part reactor, wherein at least one of the catalyst systems in step (a) or (b) comprises a metal complex of a polyvalent aryloxyether corresponding to the formula:

wherein $M^3$ is Ti, Hf or Zr, preferably Zr;

$Ar^4$ is independently in each occurrence a substituted $C_{9-20}$ aryl group, wherein the substituents, independently in each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks co-planarity with the aryl group to which it is attached;

$T^4$ is independently in each occurrence a $C_{2-20}$ alkylene, cycloalkylene or cycloalkenylene group, or an inertly substituted derivative thereof;

$R^{21}$ is independently in each occurrence hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ is independently in each occurrence hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$ is independently in each occurrence halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group.

The ethylene/α-olefin interpolymer composition may be produced via a solution polymerization according to the following exemplary process.

All raw materials (ethylene, 1-octene) and the process solvent (a narrow boiling range high-purity isoparaffinic solvent commercially available under the tradename Isopar E from ExxonMobil Corporation) are purified with molecular sieves before introduction into the reaction environment. Hydrogen is supplied in pressurized cylinders as a high purity grade and is not further purified. The reactor monomer feed (ethylene) stream is pressurized via mechanical compressor to a pressure that is above the reaction pressure, approximate to 750 psig. The solvent and comonomer (1-octene) feed is pressurized via mechanical positive displacement pump to a pressure that is above the reaction pressure, approximately 750 psig. The individual catalyst components are manually batch diluted to specified component concentrations with purified solvent (Isopar E) and pressurized to a pressure that is above the reaction pressure, approximately 750 psig. All reaction feed flows are measured with mass flow meters, independently controlled with computer automated valve control systems.

The continuous solution polymerization reactor system may consist of two liquid full, non-adiabatic, isothermal, circulating, and independently controlled loops operating in a series configuration. Each reactor has independent control of all fresh solvent, monomer, comonomer, hydrogen, and catalyst component feeds. The combined solvent, monomer, comonomer and hydrogen feed to each reactor is independently temperature controlled to anywhere between 5° C. to 50° C. and typically 40° C. by passing the feed stream through a heat exchanger. The fresh comonomer feed to the polymerization reactors can be manually aligned to add comonomer to one of three choices: the first reactor, the second reactor, or the common solvent and then split between both reactors proportionate to the solvent feed split. The total fresh feed to each polymerization reactor is injected into the reactor at two locations per reactor roughly with equal reactor volumes between each injection location. The fresh feed is controlled typically with each injector receiving half of the total fresh feed mass flow. The catalyst components are injected into the polymerization reactor through specially designed injection stingers and are each separately injected into the same relative location in the reactor with no contact time prior to the reactor. The primary catalyst component feed is computer controlled to maintain the reactor monomer concentration at a specified target. The two cocatalyst components are fed based on calculated specified molar ratios to the primary catalyst component. Immediately following each fresh injection location (either feed or catalyst), the feed streams are mixed with the circulating polymerization reactor contents with static mixing elements. The contents of each reactor are continuously circulated through heat exchangers responsible for removing much of the heat of reaction and with the temperature of the coolant side responsible for maintaining isothermal reaction environment at the specified temperature. Circulation around each reactor loop is provided by a screw pump. The effluent from the first polymerization reactor (containing solvent, monomer, comonomer, hydrogen, catalyst components, and molten polymer) exits the first reactor loop and passes through a control valve (responsible for maintaining the pressure of the first reactor at a specified target) and is injected into the second polymerization reactor of similar design. As the stream exits the reactor, it is contacted with a deactivating agent, e.g. water, to stop the reaction. In addition, various additives such as antioxidants, can be added at this point. The stream then goes through another set of static mixing elements to evenly disperse the catalyst deactivating agent and additives.

Following additive addition, the effluent (containing solvent, monomer, comonomer, hydrogen, catalyst components, and molten polymer) passes through a heat exchanger to raise the stream temperature in preparation for separation of the polymer from the other lower boiling reaction components. The stream then enters a two stage separation and devolatilization system where the polymer is removed from the solvent, hydrogen, and unreacted monomer and comonomer. The recycled stream is purified before entering the reactor again. The separated and devolatized polymer melt is pumped through a die specially designed for underwater pelletization, cut into uniform solid pellets, dried, and transferred into a hopper.

End-Use Applications

The inventive compositions are suitable for cast films, i.e. films extruded from a flat die onto a chilled roll or a nipped roll, optionally, with a vacuum box and/or air-knife. The inventive compositions may be extruded in neat form or in blends with other polymers, additives and fillers. The films may be monolayer or coextruded multi-layer films obtained by various extrusion through a single or multiple dies. The resultant films may be the used as-is or may be laminated to other films or substrates, for example by thermal, adhesive lamination or direct extrusion onto a substrate. The resultant films and laminates may be subjected to other forming operations such as embossing, stretching, thermoforming. Surface treatments such as corona may be applied and the films may be printed.

In the cast film extrusion process, a thin film is extruded through a slit onto a chilled, highly polished turning roll, where it is quenched from one side. The speed of the roller controls the draw ratio and final film thickness. The film is then sent to a second roller for cooling on the other side. Finally it passes through a system of rollers and is wound onto a roll.

In another embodiment, two or more thin films are coextruded through two or more slits onto a chilled, highly polished turning roll, the coextruded film is quenched from one side. The speed of the roller controls the draw ratio and final coextruded film thickness. The coextruded film is then sent to a second roller for cooling on the other side. Finally it passes through a system of rollers and is wound onto a roll.

The cast film product may further be laminated one or more layers into a multilayer structure. The films made with inventive compositions exhibit good processability in extrusion and result in films with excellent optical properties (clarity, haze, gloss), heat sealing properties, low taste & odor and low extractables, excellent abuse resistance properties such as dart, tear and puncture, and excellent stretchability.

The films and laminates made from inventive compositions may be used in a variety of purposes, for example food packaging (dry foods, fresh foods, frozen foods, liquids, processed foods, powders, granules), for packaging of detergents, toothpaste, towels, for labels and release liners. The films may also be used in unitization and industrial packaging, notably in stretch films. The films are also suitable in hygiene and medical applications, for example in breathable and non-breathable films used in diapers, adult incontinence products, feminine hygiene products, ostomy bags. Finally the inventive films may also be used in tapes and artificial turf applications.

EXAMPLES

The following examples illustrate the present invention but are not intended to limit the scope of the invention.

Inventive Compositions 1-3 (IC 1-3)

Inventive Compositions (IC) 1-3, i.e. Inventive Ethylene-octene Interpolymers, were prepared via solution polymerization in a dual loop reactor system in the presence of a Zirconium based catalyst system ("Post-Metallocene Catalyst") comprising [2,2'''-[1,3-propanediylbis(oxy-κO)]bis[3'',5,5''-tris(1,1-dimethylethyl)-5'-methyl[1,1':3',1''-terphenyl]-2'-olato-κO]]dimethyl-, (OC-6-33)-Zirconium, represented by the following formula:

The polymerization conditions for IC 1-3 (Ethylene-octene Interpolymers) are reported in Tables 1 and 2. Referring to Tables 1 and 2, MMAO is modified methyl aluminoxane; and RIBS-2 is bis(hydrogenated tallow alkyl) methyl, tetrakis(pentafluorophenyl)borate(1-) amine. Properties of the Inventive Compositions 1-3 (IC 1-3) were measured and reported in Tables 3-8.

Comparative Composition A

Comparative Composition A is ELITE 5230G, an ethylene-octene copolymer, supplied by The Dow Chemical Company, having a melt index of approximately 4 g/10 minutes and a density of approximately 0.916 g/cc.

Inventive Films 1-3 and Comparative Film A

Inventive Compositions 1-3 and Comparative Composition A were fabricated into 1 mil thick Inventive Films 1-3 and Comparative Film A, respectively, on a 5 layer Egan Davis Standard coextrusion cast film line. The cast line consists of three 2½" and two 2" 30:1 L/D Egan Davis Standard MAC extruders which are air cooled. All extruders have moderate work DSB (Davis Standard Barrier) type screws. A CMR 2000 microprocessor monitors and controls operations. The extrusion process is monitored by pressure transducers located before and after the breaker plate as well as four heater zones on each barrel, one each at the adapter and the block and two zones on the die. The microprocessor also tracks the extruder RPM, % FLA, HP, rate, line speed, % draw, primary and secondary chill roll temperatures, gauge deviation, layer ratio, rate/RPM, and melt temperature for each extruder. Equipment specifications include a Cloeren 5 layer dual plane feed block and a Cloeren 36" Epich II autogage 5.1 die. The primary chill roll has a matte finish and is 40" O.D.×40" long with a 30-40 RMS surface finish for improved release characteristics. The secondary chill roll is 20" O.D.×40" long with a 2-4 RMS surface for improved web tracking. Both the primary and secondary chill roll has chilled water circulating through it to provide quenching. There is an NDC Beta gauge sensor for gauge thickness and automatic gauge control if needed. Rate is measured by five Barron weigh hoppers with load cells on each hopper for gravimetric control. Samples are finished on the two position single turret Horizon winder on 3" I.D. cores with center wind automatic roll changeover and slitter station. The maximum throughput rate for the line is 600 pounds per hour and maximum line speed is 900 feet per minute.

Inventive Films 1-3 and Comparative Film A were fabricated according to the following conditions:
Temperature Profile: B1 300° F., B2 475° F.,
  B3 to B5 525° F., Screen 525° F.,
  Adaptor 525° F., Die 525° F.
Melt Temperature: 525° F.
Line speed: 450-465 ft/min
Through put rate: 400-450 lb/hr
Chill roll temperature: 70° F.
Cast roll temperature: 70° F.
Air knife: 6 inches
Vacuum box: OFF
Die gap: 20-25 mil Inventive Films 1-3 and Comparative Film A were tested for their properties, and those properties reported in Table 9.

TABLE 1

|  | Units | IC1 | IC2 | IC3 |
|---|---|---|---|---|
| 1. REACTOR FEEDS | | | | |
| Primary Reactor Feed Temperature | ° C. | 40.0 | 30.0 | 30.0 |
| Primary Reactor Total Solvent Flow | lbs/h | 1076.62 | 1082.53 | 1004.71 |
| Primary Reactor Fresh Ethylene Flow | lbs/h | 230.83 | 232.45 | 191.92 |
| Primary Reactor Total Ethylene Flow | lbs/h | 239.31 | 241.07 | 199.94 |
| Comonomer Type Used | | | 1-octene | |
| Primary Reactor Fresh Comonomer Flow | lbs/h | 41.86 | 47.89 | 25.44 |
| Primary Reactor Total Comonomer Flow | lbs/h | 78.54 | 69.32 | 66.01 |
| Primary Reactor Comonomer/Olefin Ratio | % | 24.72 | 22.31 | 24.80 |
| Primary Reactor Feed Solvent/Ethylene Ratio | | 4.658 | 4.653 | 5.235 |

TABLE 1-continued

| | Units | IC1 | IC2 | IC3 |
|---|---|---|---|---|
| Primary Reactor Fresh Hydrogen Flow | std cm³/min | 6913.3 | 3159.1 | 8485.1 |
| Primary Reactor Hydrogen Mole Percent | mol % | 0.442 | 0.201 | 0.647 |
| Secondary Reactor Feed Temperature | °C. | 39.7 | 30.6 | 30.1 |
| Secondary Reactor Total Solvent Flow | lbs/h | 499.66 | 498.97 | 632.71 |
| Secondary Reactor Fresh Ethylene Flow | lbs/h | 188.00 | 187.46 | 237.96 |
| Secondary Reactor Total Ethylene Flow | lbs/h | 191.97 | 191.61 | 243.08 |
| Secondary Reactor Fresh Comonomer Flow | lbs/h | 0 | 0 | 16.06 |
| Secondary Reactor Total Comonomer Flow | lbs/h | 18.24 | 10.87 | 41.96 |
| Secondary Reactor Comonomer/Olefin Ratio | % | 8.65 | 5.35 | 14.69 |
| Secondary Reactor Feed Solvent/Ethylene Ratio | | 2.655 | 2.657 | 2.656 |
| Secondary Reactor Fresh Hydrogen Flow | std cm³/min | 5773.9 | 17757.5 | 276.8 |
| Secondary Reactor Hydrogen Mole Percent | mol % | 0.461 | 1.399 | 0.017 |
| Overall Comonomer/Olefin Ratio | | 11.862 | 15.640 | 19.608 |
| Overall Solvent/Ethylene Ratio | wt % | 3.76 | 3.76 | 3.81 |
| 2. REACTION | | | | |
| Primary Reactor Control Temperature | °C. | 150.2 | 160.0 | 155.0 |
| Primary Reactor Pressure | Psig | 725.0 | 725.4 | 725.1 |
| Primary Reactor Ethylene Conversion | % | 89.85 | 95.62 | 85.16 |
| Primary Reactor Percent Solids | % | 19.64 | 21.18 | 16.38 |
| Primary Reactor Polymer Residence Time | Hrs | 0.263 | 0.269 | 0.289 |
| Secondary Reactor Control Temperature | °C. | 190.0 | 190.0 | 190.0 |
| Secondary Reactor Pressure | Psig | 729.4 | 731.2 | 728.2 |
| Secondary Reactor Ethylene Conversion | % | 85.56 | 84.80 | 86.06 |
| Secondary Reactor Percent Solids | % | 23.65 | 23.73 | 23.28 |
| Secondary Reactor Polymer Residence Time | Hrs | 0.100 | 0.102 | 0.096 |
| Primary Reactor Split | % | 54.51 | 58.70 | 40.76 |

TABLE 2

| | Units | IC1 | IC2 | IC3 |
|---|---|---|---|---|
| 3. CATALYST | | | | |
| Primary Reactor Catalyst Type | | \multicolumn{3}{c}{Zr-Based bis-phenyl phenoxy Catalyst} | | |
| Primary Reactor Catalyst Flow | lbs/h | 1.200 | 0.711 | 0.696 |
| Primary Reactor Catalyst Concentration | Ppm | 48.8 | 199.3 | 85.9 |
| Primary Reactor Catalyst Efficiency | 10⁶ Lb | 4.397 | 1.976 | 3.268 |
| Primary Reactor Catalyst-1 Mole Weight | Mw | 91.103 | 91.103 | 91.103 |
| Primary Reactor Co-Catalyst-1 Molar Ratio | | 1.686 | 1.483 | 1.583 |
| Primary Reactor Co-Catalyst-1 Type | | | RIBS2 | |
| Primary Reactor Co-Catalyst-1 Flow | lbs/h | 0.619 | 2.310 | 0.382 |
| Primary Reactor Co-Catalyst-1 Concentration | Ppm | 1992.7 | 1199.5 | 3198.1 |
| Primary Reactor Co-Catalyst-2 Molar Ratio | | 8.490 | 18.035 | 17.984 |
| Primary Reactor Co-Catalyst-2 Type | | | MMAO | |
| Primary Reactor Co-Catalyst-2 Flow | lbs/h | 0.492 | 0.473 | 0.228 |
| Primary Reactor Co-Catalyst-2 Concentration | Ppm | 298.9 | 1598.1 | 1398.8 |
| Secondary Reactor Catalyst Type | | \multicolumn{3}{c}{Zr-Based bis-phenyl phenoxy Catalyst} | | |
| Secondary Reactor Catalyst Flow | lbs/h | 0.959 | 0.574 | 0.731 |
| Secondary Reactor Catalyst Concentration | Ppm | 48.8 | 199.3 | 199.3 |
| Secondary Reactor Catalyst Efficiency | 10⁶ Lb | 3.950 | 1.718 | 1.971 |
| Secondary Reactor Co-Catalyst-1 Molar Ratio | | 1.573 | 1.499 | 1.496 |
| Secondary Reactor Co-Catalyst-1 Type | | RIBS2 | RIBS2 | RIBS2 |
| Secondary Reactor Co-Catalyst-1 Flow | lbs/h | 0.479 | 0.566 | 0.897 |
| Secondary Reactor Co-Catalyst-1 Concentration | Ppm | 1992.7 | 3995.7 | 3198.1 |
| Secondary Reactor Co-Catalyst-2 Molar Ratio | | 7.947 | 10.024 | 10.025 |
| Secondary Reactor Co-Catalyst-2 Type | | | MMAO-3A | |
| Secondary Reactor Co-Catalyst-2 Flow | lbs/h | 0.369 | 0.213 | 0.303 |
| Secondary Reactor Co-Catalyst-2 Concentration | Ppm | 298.9 | 1598.1 | 1398.8 |
| 4. POLYMER | | | | |
| GI200 Average Gel Area | mm/24.6 cm³ | 1.00 | 2.31 | 2.38 |

TABLE 3

|  | IC-1 | IC-2 | IC-3 |
|---|---|---|---|
| Overall Density (g/cc) | 0.917 | 0.918 | 0.918 |
| $I_2$ (g/10 m) | 3.5 | 3.5 | 3.5 |
| 1$^{st}$ Reactor Catalyst | Post-Metallocene Catalyst | Post-Metallocene Catalyst | Post-Metallocene Catalyst |
| 1$^{st}$ Component Density (g/cc) | 0.910 | 0.906 | 0.918 |
| 1$^{st}$ Component $I_2$ (g/cc) | 0.7 | 0.9 | 3.5 |
| 1$^{st}$ Component (% wt) | 55 | 60 | 55 |
| 2$^{nd}$ Component Catalyst | Post-Metallocene Catalyst | Post-Metallocene Catalyst | Post-Metallocene Catalyst |
| 2$^{nd}$ Component target Density (g/cc) | 0.926 | 0.936 | 0.918 |
| 2$^{nd}$ Component target $I_2$ (g/cc) | 371 | 244 | 3.5 |

TABLE 4

|  | Density g/cc | $I_2$ dg/min | $I_{10}/I_2$ |
|---|---|---|---|
| IC-1 | 0.9182 | 3.23 | 6.93 |
| IC-2 | 0.9185 | 3.38 | 8.45 |
| IC-3 | 0.9176 | 3.32 | 6.93 |
| CC-A | 0.9171 | 4.09 | 7.03 |

TABLE 5

Unsaturation unit/1,000,000 carbon

|  | vinylene | +/− | trisubstituted | +/− | vinyl | +/− | vinylidene | +/− | Total |
|---|---|---|---|---|---|---|---|---|---|
| IC-1 | 6 | 1 | 2 | 1 | 52 | 3 | 5 | 1 | 65 |
| IC-2 | 6 | 0 | ND |  | 39 | 2 | 3 | 0 | 48 |
| IC-3 | 7 | 1 | 2 | 1 | 53 | 3 | 5 | 1 | 67 |
| CC-A | 56 | 4 | 23 | 2 | 162 | 8 | 39 | 2 | 280 |

TABLE 6

|  | CDI | Stdev (° C.) | Half Width (° C.) | Half Width/Stdv | CDC |
|---|---|---|---|---|---|
| IC-1 | 0.871 | 8.057 | 7.535 | 0.935 | 93.2 |
| IC-2 | 0.830 | 8.846 | 15.936 | 1.801 | 46.0 |
| IC-3 | 0.882 | 6.979 | 4.670 | 0.669 | 131.8 |
| CC-A | 0.704 | 12.441 | 6.550 | 0.526 | 133.7 |

TABLE 7

|  | $M_w$ | ZSV (Pas) | ZSVR |
|---|---|---|---|
| IC-1 | 77605 | 2743 | 1.70 |
| IC-2 | 71948 | 3485 | 2.85 |
| IC-3 | 75954 | 2634 | 1.77 |
| CC-A | 75116 | 2241 | 1.56 |

TABLE 8

|  | $M_n$ | $M_w$ | $M_z$ | $M_p$ | $M_w/M_n$ | $M_z/M_w$ |
|---|---|---|---|---|---|---|
| IC-1 | 32027 | 77605 | 145809 | 60153 | 2.42 | 1.88 |
| IC-2 | 20900 | 71948 | 167252 | 34778 | 3.44 | 2.32 |
| IC-3 | 38751 | 75954 | 126193 | 64329 | 1.96 | 1.66 |
| CC-A | 25592 | 75116 | 152617 | 62374 | 2.94 | 2.03 |

TABLE 9

|  | Inventive Film 1 | Inventive Film 2 | Inventive Film 3 | Comparative Film A |
|---|---|---|---|---|
| Clarity [%] | 99.3 | 99.1 | 99.4 | 99.3 |
| Clarity [%] stdev | 0.1 | 0.2 | 0.1 | 0.1 |
| Gloss [20°] | 146.7 | 141.1 | 143.2 | 144.4 |
| Gloss [20°] stdev | 1.6 | 2.9 | 1.9 | 3.8 |
| Gloss [45°] | 92.8 | 93.0 | 92.4 | 93.0 |
| Gloss [45°] stdev | 0.3 | 0.3 | 0.4 | 0.2 |
| Haze[%] normalized to 1.00 mil | 0.7 | 0.8 | 0.9 | 0.7 |
| Dart A [g] | 388 | 199 | 346 | 328 |
| Elmendorf Tear - Type B - CD [g/mil] | 534 | 630 | 545 | 580 |
| Elmendorf Tear - Type B - MD [g/mil] | 266 | 319 | 282 | 357 |
| Heat Seal Strength at 90° C. [lbs/inch] | 0.28 | 0.71 | 0.12 | 1.28 |
| Heat Seal Strength at 90° C. [lbs/inch] stdev | 0.04 | 0.08 | 0.02 | 0.26 |
| Heat Seal Strength at 100° C. [lbs/inch] | 2.24 | 2.22 | 2.34 | 2.21 |
| Heat Seal Strength at 100° C. [lbs/inch] stdev | 0.07 | 0.08 | 0.09 | 0.06 |
| Heat Seal Strength at 110° C. [lbs/inch] | 2.41 | 2.57 | 2.30 | 2.42 |
| Heat Seal Strength at 110° C. [lbs/inch] stdev | 0.07 | 0.11 | 0.29 | 0.48 |
| Heat Seal Strength at 120° C. [lbs/inch] | 2.38 | 2.53 | 2.60 | 2.26 |
| Heat Seal Strength at 120° C. [lbs/inch] stdev | 0.17 | 0.14 | 0.21 | 0.48 |
| Heat Seal Strength at 130° C. [lbs/inch] | 2.17 | 2.55 | 2.52 | 2.33 |
| Heat Seal Strength at 130° C. [lbs/inch] stdev | 0.28 | 0.45 | 0.21 | 0.20 |
| Heat Seal Strength at 140° C. [lbs/inch] | 2.00 | 2.62 | 2.56 | 2.55 |
| Heat Seal Strength at 140° C. [lbs/inch] stdev | 0.39 | 0.35 | 0.21 | 0.12 |

Test Methods

Test methods include the following:
Melt Index

Melt indices ($I_2$ and $I_{10}$) were measured in accordance to ASTM D-1238 at 190° C. and at 2.16 kg and 10 kg load, respectively. Their values are reported in g/10 min.
Density Samples for density measurement were prepared according to ASTM D4703. Measurements were made within one hour of sample pressing using ASTM D792, Method B.
High Temperature Gel Permeation Chromatography The Gel Permeation Chromatography (GPC) system consists of a Waters (Milford, Mass.) 150 C high temperature chromatograph (other suitable high temperatures GPC instruments include Polymer Laboratories (Shropshire, UK) Model 210 and Model 220) equipped with an on-board differential refractometer (RI) (other suitable concentration detectors can include an IR4 infra-red detector from Polymer ChAR (Valencia, Spain)). Data collection is performed using Viscotek TriSEC software, Version 3, and a 4-channel Viscotek Data Manager DM400. The system is also equipped with an on-line solvent degassing device from Polymer Laboratories (Shropshire, United Kingdom).

Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of trichlorobenzene (TCB). Both solvents are sparged with nitrogen. The polyethylene samples are gently stirred at 160° C. for four hours. The injection volume is 200 microliters. The flow rate through the GPC is set at 1 ml/minute.

The GPC column set is calibrated by running 21 narrow molecular weight distribution polystyrene standards. The molecular weight (MW) of the standards ranges from 580 to 8,400,000, and the standards are contained in 6 "cocktail" mixtures. Each standard mixture has at least a decade of separation between individual molecular weights. The standard mixtures are purchased from Polymer Laboratories. The polystyrene standards are prepared at 0.025 g in 50 mL of solvent for molecular weights equal to or greater than 1,000,000 and 0.05 g in 50 mL of solvent for molecular weights less than 1,000,000. The polystyrene standards were dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weight using the following Equation (as described in Williams and Ward, *J. Polym. Sci., Polym. Letters*, 6, 621 (1968)):

$$M_{polyethylene} = A \times (M_{polystyrene})^B,$$

where M is the molecular weight of polyethylene or polystyrene (as marked), and B is equal to 1.0. It is known to those of ordinary skill in the art that A may be in a range of about 0.38 to about 0.44 and is determined at the time of calibration using a broad polyethylene standard. Use of this polyethylene calibration method to obtain molecular weight values, such as the molecular weight distribution (MWD or $M_w/M_n$), and related statistics (generally refers to conventional GPC or cc-GPC results), is defined here as the modified method of Williams and Ward.

Crystallization Elution Fractionation (CEF) Method

Comonomer distribution analysis is performed with Crystallization Elution Fractionation (CEF) (PolymerChar in Spain) (B Monrabal et al, Macromol. Symp. 257, 71-79 (2007)). Ortho-dichlorobenzene (ODCB) with 600 ppm antioxidant butylated hydroxytoluene (BHT) is used as solvent. Sample preparation is done with autosampler at 160° C. for 2 hours under shaking at 4 mg/ml (unless otherwise specified). The injection volume is 300 µl. The temperature profile of CEF is: crystallization at 3° C./min from 110° C. to 30° C., the thermal equilibrium at 30° C. for 5 minutes, elution at 3° C./min from 30° C. to 140° C. The flow rate during crystallization is at 0.052 ml/min. The flow rate during elution is at 0.50 ml/min. The data is collected at one data point/second. CEF column is packed by the Dow Chemical Company with glass beads at 125 µm±6% (MO-SCI Specialty Products) with ⅛ inch stainless tubing. Glass beads are acid washed by MO-SCI Specialty with the request from the Dow Chemical Company. Column volume is 2.06 ml. Column temperature calibration is performed by using a mixture of NIST Standard Reference Material Linear polyethylene 1475a (1.0 mg/ml) and Eicosane (2 mg/ml) in ODCB. Temperature is calibrated by adjusting elution heating rate so that NIST linear polyethylene 1475a has a peak temperature at 101.0° C., and Eicosane has a peak temperature of 30.0° C. The CEF column resolution is calculated with a mixture of NIST linear polyethylene 1475a (1.0 mg/ml) and hexacontane (Fluka, purum, ≥97.0%, 1 mg/ml). A baseline separation of hexacontane and NIST polyethylene 1475a is achieved. The area of hexacontane (from 35.0 to 67.0° C.) to the area of NIST 1475a from 67.0 to 110.0° C. is 50 to 50, the amount of soluble fraction below 35.0° C. is <1.8 wt %. The CEF column resolution is defined in the following equation:

$$\text{Resolution} = \frac{\text{Peak temperature of NIST 1475a} - \text{Peak Temperature of Hexacontane}}{\text{Half height Width of NIST 1475a} + \text{Half height Width of Hexacontane}}$$

where the column resolution is 6.0.

Comonomer Distribution Constant (CDC) Method

Comonomer distribution constant (CDC) is calculated from comonomer distribution profile by CEF. CDC is defined as Comonomer Distribution Index divided by Comonomer Distribution Shape Factor multiplying by 100 as shown in the following equation:

$$CDC = \frac{\text{Comonomer Distribution Index}}{\text{Comonomer Distribution Shape Factor}} = \frac{\text{Comonomer Distribution Index}}{\frac{HalfWidth}{Stdev}} \times 100$$

Comonomer distribution index stands for the total weight fraction of polymer chains with the comonomer content ranging from 0.5 of median comonomer content ($C_{median}$) and 1.5 of $C_{median}$ from 35.0 to 119.0° C. Comonomer Distribution Shape Factor is defined as a ratio of the half width of comonomer distribution profile divided by the standard deviation of comonomer distribution profile from the peak temperature ($T_p$).

CDC is calculated from comonomer distribution profile by CEF, and CDC is defined as Comonomer Distribution Index divided by Comonomer Distribution Shape Factor multiplying by 100 as shown in the following Equation:

$$CDC = \frac{\text{Comonomer Distribution Index}}{\text{Comonomer Distribution Shape Factor}} = \frac{\text{Comonomer Distribution Index}}{\frac{HalfWidth}{Stdev}} \times 100$$

wherein Comonomer distribution index stands for the total weight fraction of polymer chains with the comonomer content ranging from 0.5 of median comonomer content ($C_{median}$) and 1.5 of $C_{median}$ from 35.0 to 119.0° C., and wherein Comonomer Distribution Shape Factor is defined as a ratio of the half width of comonomer distribution profile divided by the standard deviation of comonomer distribution profile from the peak temperature (Tp).

CDC is calculated according to the following steps:

(A) Obtain a weight fraction at each temperature (T) ($w_T(T)$) from 35.0° C. to 119.0° C. with a temperature step increase of 0.200° C. from CEF according to the following Equation:

$$\int_{35}^{119} w_T(T) dT = 1$$

(B) Calculate the median temperature ($T_{median}$) at cumulative weight fraction of 0.500, according to the following Equation:

$$\int_{35}^{T_{median}} w_T(T) dT = 0.5$$

(C) Calculate the corresponding median comonomer content in mole % ($C_{median}$) at the median temperature ($T_{median}$) by using comonomer content calibration curve according to the following Equation:

$$\ln(1 - comonomercontent) = -\frac{207.26}{276.12 + T} + 0.5533 \quad R^2 = 0.997$$

(D) Construct a comonomer content calibration curve by using a series of reference materials with known amount of comonomer content, i.e., eleven reference materials with narrow comonomer distribution (mono-modal comonomer distribution in CEF from 35.0 to 119.0° C.) with weight average $M_w$ of 35,000 to 115,000 (measured via conventional GPC) at a comonomer content ranging from 0.0 mole % to 7.0 mole % are analyzed with CEF at the same experimental conditions specified in CEF experimental sections;

(E) Calculate comonomer content calibration by using the peak temperature ($T_p$) of each reference material and its comonomer content; The calibration is calculated from each reference material according to the following Equation:

$$\ln(1 - comonomercontent) = -\frac{207.26}{276.12 + T} + 0.5533 \quad R^2 = 0.997$$

wherein: $R^2$ is the correlation constant;

(F) Calculate Comonomer Distribution Index from the total weight fraction with a comonomer content ranging from $0.5*C_{median}$ to $1.5*C_{median}$, and if $T_{median}$ is higher than 98.0° C., Comonomer Distribution Index is defined as 0.95;

(G) Obtain Maximum peak height from CEF comonomer distribution profile by searching each data point for the highest peak from 35.0° C. to 119.0° C. (if the two peaks are identical, then the lower temperature peak is selected); half width is defined as the temperature difference between the front temperature and the rear temperature at the half of the maximum peak height, the front temperature at the half of the maximum peak is searched forward from 35.0° C., while the rear temperature at the half of the maximum peak is searched backward from 119.0° C., in the case of a well defined bimodal distribution where the difference in the peak temperatures is equal to or greater than the 1.1 times of the sum of half width of each peak, the half width of the inventive ethylene-based polymer composition is calculated as the arithmetic average of the half width of each peak; (H) Calculate the standard deviation of temperature (Stdev) according the following Equation:

$$Stdev = \sqrt{\sum_{35}^{119} (T - T_p)^2 \times w_T(T)}$$

Creep Zero Shear Viscosity Measurement Method

Zero-shear viscosities are obtained via creep tests that were conducted on an AR-G2 stress controlled rheometer (TA Instruments; New Castle, Del.) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for 5 minutes. The upper plate is then lowered down to 50 above the desired testing gap (1.5 mm). Any superfluous material is trimmed off and the upper plate is lowered to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the range of $10^{-3}$ to $10^{-4}$ s$^{-1}$ for the samples in this study. Steady state is determined by taking a linear regression for all the data in the last 10% time window of the plot of log (J(t)) vs. log(t), where J(t) is creep compliance and t is creep time. If the slope of the linear regression is greater than 0.97, steady state is considered to be reached, then the creep test is stopped. In all cases in this study the slope meets the criterion within 2 hours. The steady state shear rate is determined from the slope of the linear regression of all of the data points in the last 10% time window of the plot of $\epsilon$ vs. t, where $\epsilon$ is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

Zero-Shear Viscosity Ratio (ZSVR) is defined as the ratio of the zero-shear viscosity (ZSV) of the branched polyethylene material to the ZSV of the linear polyethylene material at the equivalent weight average molecular weight (Mw-gpc) according to the following Equation:

$$ZSVR = \frac{\eta_{0B}}{\eta_{0L}} = \frac{\eta_{0B}}{2.29 + \times 10^{-15} M_{w\text{-}gpc}^{3.65}}$$

The ZSV value is obtained from creep test at 190° C. via the method described above. The Mw-gpc value is determined by the conventional GPC method. The correlation between ZSV of linear polyethylene and its Mw-gpc was established based on a series of linear polyethylene reference materials. A description for the ZSV-Mw relationship can be found in the ANTEC proceeding: Karjala, Teresa P.; Sammler, Robert L.; Mangnus, Marc A.; Hazlitt, Lonnie G.; Johnson, Mark S.; Hagen, Charles M., Jr.; Huang, Joe W. L.; Reichek, Kenneth N. Detection of low levels of long-chain branching in polyolefins. Annual Technical Conference—Society of Plastics Engineers (2008), 66th 887-891.

$^1$H NMR Method 3.26 g of stock solution is added to 0.133 g of polyolefin sample in 10 mm NMR tube. The stock solution is a mixture of tetrachloroethane-d$_2$ (TCE) and perchloroethylene (50:50, w:w) with 0.001M Cr$^{3+}$. The solution in the tube is purged with N$_2$ for 5 minutes to reduce the amount of oxygen. The capped sample tube is left at room temperature overnight to swell the polymer sample. The sample is dissolved at 110° C. with shaking. The samples are free of the additives that may contribute to unsaturation, e.g. slip agents such as erucamide.

The $^1$H NMR are run with a 10 mm cryoprobe at 120° C. on Bruker AVANCE 400 MHz spectrometer.

Two experiments are run to get the unsaturation: the control and the double pre-saturation experiments.

For the control experiment, the data is processed with exponential window function with LB=1 Hz, baseline was corrected from 7 to −2 ppm. The signal from residual $^1$H of TCE is set to 100, the integral $I_{total}$ from −0.5 to 3 ppm is used as the signal from whole polymer in the control experiment. The number of $CH_2$ group, $NCH_2$, in the polymer is calculated as following:

$$NCH_2 = I_{total}/2$$

Figure 1:
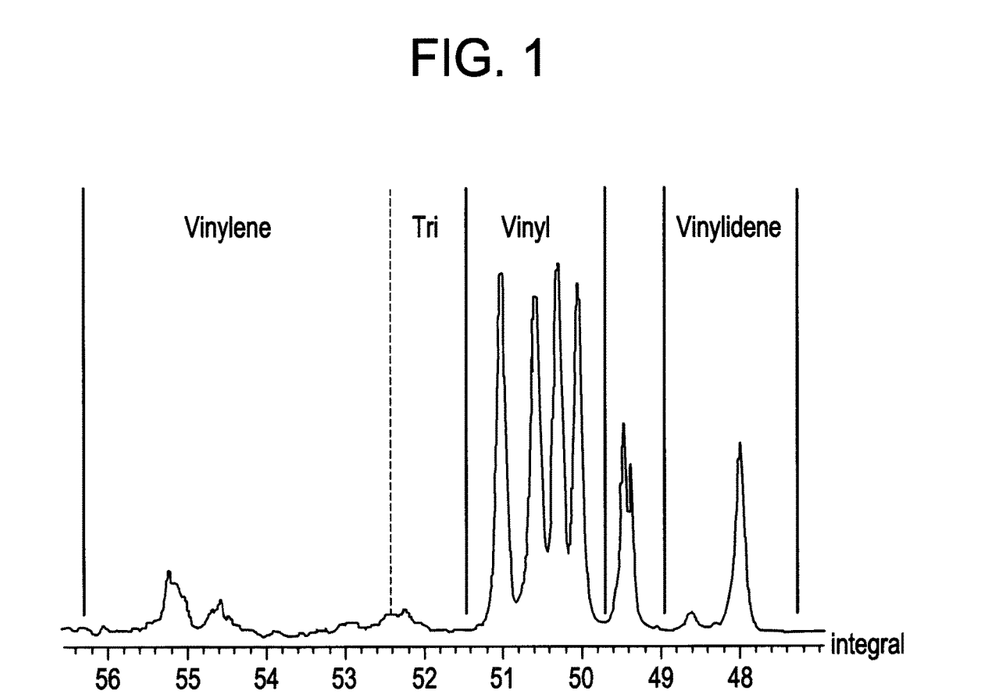
FIG. 1 is a proton (H$^1$) nuclear magnetic resonance (NMR) spectrum.

For the double presaturation experiment, the data is processed with exponential window function with LB=1 Hz, baseline was corrected from 6.6 to 4.5 ppm. The signal from residual $_1$H of TCE is set to 100, the corresponding integrals for unsaturations ($I_{vinylene}$, $I_{trisubstituted}$, $I_{vinyl}$ and $I_{vinylidene}$) were integrated based on the region shown in FIG. 1.

The number of unsaturation unit for vinylene, trisubstituted, vinyl and vinylidene are calculated:

$$N_{vinylene} = I_{vinylene}/2$$

$$N_{trisubstituted} = I_{trisubstitute}$$

$$N_{vinyl} = I_{vinyl}/2$$

$$N_{vinylidene} = I_{vinylidene}/2$$

The unsaturation unit/1,000,000 carbons is calculated as following:

$$N_{vinylene}/1,000,000\ C = (N_{vinylene}/NCH_2)*1,000,000$$

$$N_{trisubstituted}/1,000,000\ C = (N_{trisubstituted}/NCH_2)*1,000,000$$

$$N_{vinyl}/1,000,000\ C = (N_{vinyl}/NCH_2)*1,000,000$$

$$N_{vinylidene}/1,000,000\ C = (N_{vinodene}/NCH_2)*1,000,000$$

The requirement for unsaturation NMR analysis includes: level of quantitation is 0.47±0.02/1,000,000 carbons for Vd2 with 200 scans (less than 1 hour data acquisition including time to run the control experiment) with 3.9 wt % of sample (for Vd2 structure, see Macromolecules, vol. 38, 6988, 2005), 10 mm high temperature cryoprobe. The level of quantitation is defined as signal to noise ratio of 10.

Figure 2:
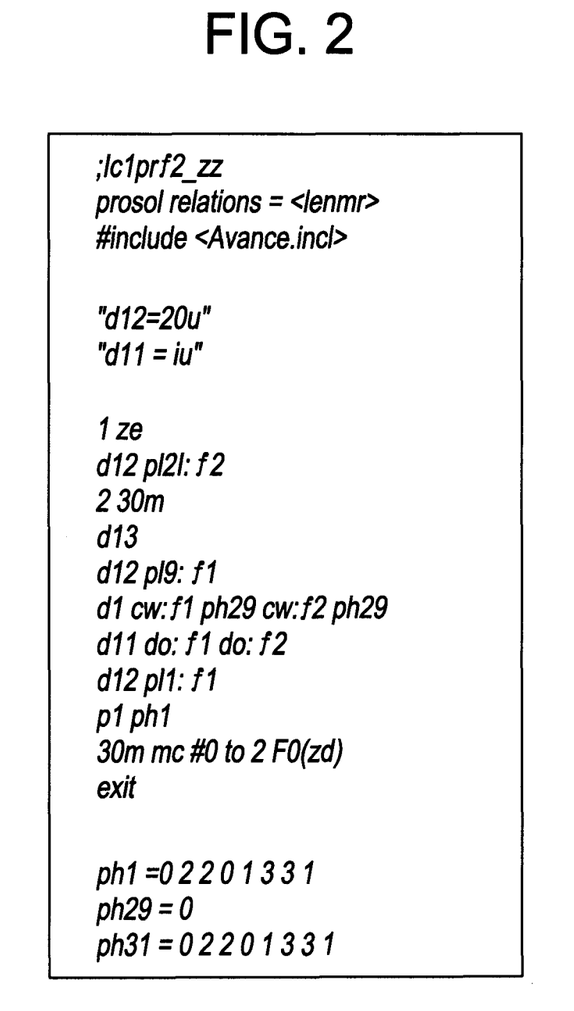
FIG. 2 is a proton (H$^1$) nuclear magnetic resonance (NMR) spectrum.

The chemical shift reference is set at 6.0 ppm for the $^1$H signal from residual proton from TCT-d2. The control is run with ZG pulse, TD 32768, NS 4, DS 12, SWH 10,000 Hz, AQ 1.64s, D1 14 s. The double presaturation experiment is run with a modified pulse sequence, O1P 1.354 ppm, O2P 0.960 ppm, PL9 57 db, PL21 70 db, TD 32768, NS 200, DS 4, SWH 10,000 Hz, AQ 1.64s, D1 1 s, D13 13 s. The modified pulse sequences for unsaturation with Bruker AVANCE 400 MHz spectrometer are shown in FIG. 2.

Film Testing Conditions

The following physical properties are measured on the films produced:

Haze: Samples measured for overall haze are sampled and prepared according to ASTM D 1746. A Hazegard Plus (BYK-Gardner USA; Columbia, Md.) is used for testing.

20° and 45° Gloss: ASTM D-2457.

MD and CD Elmendorf Tear Strength: ASTM D-1922

Dart Impact Strength: ASTM D-1709, Method A

Heat Seal Strength: ASTM F-88 (Method A) with a Kopp heat sealer. The sealing pressure was 0.275 N/mm$^2$, sealing time was 0.5 s. The sample width was 1 inch.

The present invention may be embodied in other forms without departing from the spirit and the essential attributes thereof, and, accordingly, reference should be made to the appended claims, rather than to the foregoing specification, as indicating the scope of the invention.

We claim:

1. A cast film comprising:
   a linear low density polyethylene composition comprising an ethylene/α-olefin interpolymer composition having a Comonomer Distribution Constant with comonomer distribution constant (CDC) in a range of from 40 to 200, a vinyl unsaturation of less than 0.15 vinyls per one thousand carbon atoms present in the backbone of the ethylene-based polymer composition, a zero shear viscosity ratio (ZSVR) in a range from 1.5 to 4, a density in a range of from 0.915 to 0.925 g/cm$^3$, a melt index ($I_2$) in a range of from 2 to 6 g/ 10 minutes, and a molecular weight distribution (Mw/Mn) in a range of from 2 to 3.5.

2. The cast film of claim 1, wherein said cast film is stretched at least in one direction.

3. A packaging device comprising the cast film of claim 1.

4. The packaging device of claim 3, wherein said packaging device is a food packaging device or non-food packaging device.

5. A hygiene product comprising the cast film of claim 1.

6. The cast film of claim 1, wherein said cast film is formed into tapes for use in artificial turf or woven textiles.

* * * * *